United States Patent [19]

Saito et al.

[11] Patent Number: 4,585,823

[45] Date of Patent: Apr. 29, 1986

[54] OVENWARE MOLDED FROM WHOLLY AROMATIC POLYESTER COMPOSITION

[75] Inventors: Teruo Saito, Kusatsu; Kuniaki Asai, Tondabayashi; Tadayasu Kobayashi, Ibaraki, all of Japan

[73] Assignee: Sumitomo Chemical Company, Limited, Osaka, Japan

[21] Appl. No.: 739,163

[22] Filed: May 30, 1985

[30] Foreign Application Priority Data

Jun. 13, 1984 [JP] Japan ................ 59-121522

[51] Int. Cl.$^4$ .................... C08K 3/22; C08K 3/34
[52] U.S. Cl. .................... 524/456; 523/100; 524/600; 524/605
[58] Field of Search ............. 524/456, 600, 605; 523/100

[56] References Cited

U.S. PATENT DOCUMENTS

| | | | |
|---|---|---|---|
| 4,189,422 | 2/1980 | Wakeford | 524/456 |
| 4,458,039 | 7/1984 | Eickmann | 524/456 |
| 4,503,168 | 3/1985 | Hartsing, Jr. | 524/456 |

FOREIGN PATENT DOCUMENTS

| | | | |
|---|---|---|---|
| 55-84321 | 6/1980 | Japan . | |
| 2058102 | 4/1981 | United Kingdom . | |
| 2124236 | 2/1984 | United Kingdom . | |

OTHER PUBLICATIONS

Chemical Abstracts, vol. 100, No. 22, May 28, 1984, p. 42, Abstract No. 175909p.

Primary Examiner—Lester L. Lee
Attorney, Agent, or Firm—Stevens, Davis, Miller & Mosher

[57] ABSTRACT

Ovenwares produced by molding a wholly aromatic polyester resin composition comprising 30 to 80 wt. % of a wholly aromatic polyester having a repeating unit represented by the general formula,

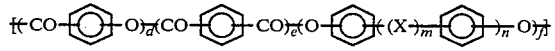

wherein X is a $C_1$-$C_4$ alkyl group or —O—, —$SO_2$—, —S— or —CO— group, m and n are 0 or 1, a d:e ratio is in the range of from 1:1 to 10:1, an e:f ratio is in the range of 9:10 to 10:9, and the positions of substituents at each aromatic ring of the foregoing general formula are para or meta to each other, 5 to 60 wt. % of wollastonite and 5 to 60 wt. % of titanium oxide.

1 Claim, No Drawings

OVENWARE MOLDED FROM WHOLLY AROMATIC POLYESTER COMPOSITION

The present invention relates to ovenwares having high thermal resistance and mechanical strength, a low degree of anisotropy (anisotropy means a difference in property between machine direction and transverse direction) and excellent appearance produced by molding a wholly aromatic polyester resin composition.

Certain kinds of plastic material such as polymethylpentene, polysulfone, etc. are used as cooking vessels for electronic ovens.

But, for cooking vessels, i.e. ovenwares, for electronic ovens having two forms of heating by microwave irradiation and an oven, are required many performances such as excellent thermal resistance, electric characteristics, chemical resistance and appearance, etc. Particularly, a very high performance is required for the thermal resistance, because the ovenwares are exposed to heat generated by not only high frequency but also ovens. For example, the ovenwares should not change in shape even at 200° to 250° C., and besides should have practical mechanical characteristics.

A wholly aromatic polyester has many excellent properties based on its structure, and particularly excels all other resins in terms of thermal resistance. Particularly, wholly aromatic polyesters produced from terephthalic acid, isophthalic acid, p-hydroxybenzoic acid or its derivative and 4,4'-dihydroxydiphenyl or its derivative can be injection-molded and besides have many excellent performances such as high thermal resistance, chemical resistance, oil resistance, radiation resistance and insulation property, etc., and therefore, they are used in wide application with the electric and electronic fields as center. Examples of application include for example motor parts (e.g. commutator, brush holder), hair dryer grills, lamp holders, relay parts, printing substrates, connectors, bobbins, parts of IC producing apparatus (e.g. IC socket, sleeve, wafer basket), thermistor cases, heat sealer parts, tools for can manufacturing, etc. The wholly aromatic polyesters have as large a dielectric loss tangent as 0.004 to 0.02 like the conventional polyesters, but, because they have a high degree of crystallinity and as very high a heat distortion temperature as 293° C., heat generation caused by microwave irradiation is controlled below the heat distortion temperature and therefore a change in shape does not occur easily. The wholly aromatic polyesters, therefore, have thermal resistance suitable for ovenwares.

In injection-molding, however, said wholly aromatic polyester shows the properties such that: The molding temperature is high; the melt viscosity largely changes even by a small difference in the molding temperature; and orientation easily appears. Consequently, the molded product obtained has defects that: A difference in mold shrinkage is large between the machine direction (MD) and transverse direction (TD)

$$\left( \frac{\text{mold shrinkage of } TD}{\text{mold shrinkage of } MD} > 10 \right);$$

the mechanical strength is high in the direction of orientation but anisotropy is high; and the appearance is not beautiful because non-uniform flow marks appear on the surface.

Consequently, when said wholly aromatic polyester has been molded into relatively large-sized products like ovenwares, warp and crack appear so frequently that pleasant appearance is not obtained.

In order to solve the foregoing problems inherent to the wholly aromatic polyester, various methods have so far been employed. For improving a large change in melt viscosity caused by molding temperature to prevent orientation, there is a method of blending with a resin of less temperature dependence.

For example, there is a method of blending with polyethylene terephthalate, polycarbonate, etc. But, in blending the foregoing wholly aromatic polyester produced with p-hydroxybenzoic acid or its derivative as center, for example a wholly aromatic polyester produced from p-hydroxybenzoic acid, terephthalic acid, isophthalic acid, 4,4'-dihydroxydiphenyl, etc., with polyethylene terephthalate and polycarbonate and then granulating and molding the resulting blend, when the blend is treated at the temperature region wherein the wholly aromatic polyester forms a uniform melt, the polyethylene terephthalate and polycarbonate easily undergo thermal decomposition at this temperature region. While when the blend is treated at the temperature region wherein the polyethylene terephthalate and polycarbonate can form a stable melt, the fluidity of the wholly aromatic polyester is so insufficient that the whole system of the composition does not form a uniform dispersion.

Alternatively, by introducing an aliphatic group such as an ethylene glycol unit into the structure of the wholly aromatic polyester, it becomes possible to reduce the intermolecular cohesive force thereby to attain improvement in fluidity and reduction in anisotropy. This method, however, causes a reduction in the thermal property to result in a remarkable reduction in the excellent property of the wholly aromatic polyester.

On the other hand, it is well known that the thermal resistance, stiffness and mold shrinkage of resins are generally improved by blending the resin with a fibrous reinforcing agent (e.g. glass fiber, carbon fiber) or powder- or slice-form inorganic filler (e.g. calcium carbonate, magnesium carbonate, aluminum hydroxide, glass bead, titanium dioxide, mica, molybdenum disulfide, graphite).

It is also noticed with said wholly aromatic polyester that, when the polyester has been blended with the above reinforcing agent and filler, improvement in thermal resistance and stiffness as well as reduction in mold shrinkage are attained according to the amounts of the reinforcing agent and filler blended. But, blending with the fibrous reinforcing agent has no effect when viewed from the standpoint of improvement in anisotropy. While in the case of the inorganic filler, fair amounts need to be blended, which makes the fluidity markedly poor and also makes it impossible to obtain the appearance improving effect.

Also, as disclosed in Japanese Patent Application Kokai (Laid-open) No. 36154/1984, the appearance and anisotropy of the wholly aromatic polyester can markedly be improved without damaging the fluidity by incorporating talc and rutile type titanium dioxide in said polyester. This method, however, causes a large reduction in the mechanical strength. Particularly, the originally low impact strength of the polyester lowers further more so that, when ovenwares have been produced from the polyester, they are unsatisfactory in terms of strength.

In view of the problems described above, the present inventors made an extensive study and as a result, found that a composition having high thermal resistance and mechanical strength, a low degree of anisotropy and excellent appearance can be obtained by blending the wholly aromatic polyester with wollastonite and titanium dioxide, and also that the molded product obtained from said composition has excellent property as ovenwares.

The present invention provides ovenwares produced by molding a wholly aromatic polyester resin composition comprising 30 to 80 wt. % of a wholly aromatic polyester having a repeating unit represented by the general formula,

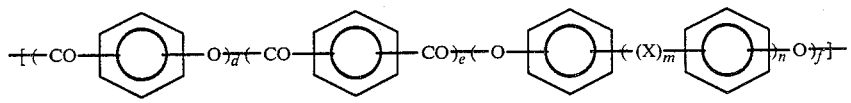

wherein X is a $C_1$-$C_4$ alkyl group or —O—, —$SO_2$—, —S— or —CO— group, m and n are 0 or 1, a d:e ratio is in the range of from 1:1 to 10:1, an e:f ratio is in the range of from 9:10 to 10:9, and the positions of substituents at each aromatic ring of the foregoing general formula are para or meta to each other, 5 to 60 wt. % of wollastonite and 5 to 60 wt. % of titanium oxide.

As the component of the wholly aromatic polyester used in the present invention, there may be used for example p-hydroxybenzoic acid, m-hydroxybenzoic acid, terephthalic acid, isophthalic acid, hydroquinone, resorcinol, 4,4'-dihydroxydiphenyl, 4,4'-dihydroxydiphenyl ether, 4,4'-dihydroxydiphenyl sulfone, 4,4'-dihydroxydiphenyl sulfide, 4,4'-dihydroxybenzophenone, 4,4'-dihydroxydiphenylmethane and derivatives thereof.

Of the combinations of these compounds, a combination of p-hydroxybenozic acid or its ester, terephthalic acid or its ester and 4,4'-dihydoxydiphenyl or its ester is particularly preferred. As a polymerization method for producing the wholly aromatic polyester, ones disclosed in Japanese Patent Application Kokai (Laid-open) Nos. 104932/1981, 44622/1982, etc. may be used, but the method is not limited to these ones.

Wollastonite used in the present invention is calcium metasilicate of natural origin and a white needle-like mineral having a chemical composition of $CaSiO_3$, a specific gravity of 2.9 and a melting point of 1540° C. Wollastonite now in practical use is such that the average particle size is 2 to 10$\mu$ and the aspect ratio is 3 to 20. Generally, wollastonite may be used without pre-treatment, but one pre-treated at the surface with a silane coupling agent (e.g. aminosilane, epoxysilane) in order to give an affinity for the wholly aromatic polyester, may also be used so far as it exerts no adverse effect on the thermal stability of the polyester. Examples of commercially available product include for example NYAD G, NYAD 325, NYAD 10 and NYCOR 200 (all are sold from Nagase Sangyo Co.) and the like.

Titanium oxide used in the present invention means titanium dioxide, $TiO_2$, which generally finds wide application as a white pigment having a large hiding power. The crystal form of titanium dioxide includes an antase form and a rutile form. The former is semi-stable and changes to the stable rutile form at high temperatures. The rutile form is larger in refractive index than the anatase one, and also its hiding power is about 35% larger than the other, so that the rutile form is more preferred also in the present invention. The particle size is generally in the range of from 0.10 to 0.40 microns. Also, titanium dioxide treated at the surface with a hydrated oxide of Al or Si or organic substance well compatible with resins may be used so far as it exerts no adverse effect on the thermal stability of said aromatic polyester. Examples of commercially available product include for example Tipaque CR-50, CR-60 and A-100 (produced by Ishihara Sangyo Co.), KR 310 (produced by Chitan Kogyo Co.) and the like. Blends comprising 30 to 80 wt. % of the wholly aromatic polyester, 5 to 60 wt. % of wollastonite and 5 to 60 wt. % of titanium dioxide (the total content of talc and titanium dioxide shall be 20 to 70 wt. % based on the whole resin composition) are effective.

When the total content of wollastonite and titanium dioxide exceeds 70 wt. % of the resin composition and the content of the wholly aromatic polyester is less than 30 wt. %, uniform compositions are not obtained because mixing is insufficient, and also molding becomes difficult because the resin composition loses fluidity. When the total content of wollastonite and titanium dioxide is less than 20 wt. %, the anisotropy improving effect is not obtained.

When the total content of wollastonite and titanium dioxide is 20 to 70 wt. % but the content of wollastonite is less than 5 wt. %, the mechanical strength, particularly impact strength is insufficient. Contrary to this, when the content of titanium dioxide is less than 5 wt. %, the appearance improving effect is insufficient.

When the content of wollastonite exceeds 60 wt. %, the appearance of the resulting molded product is damaged. While when the content of titanium dioxide exceeds 60 wt. %, mixing becomes insufficient and compounding becomes difficult so that uniform compositions are not obtained.

The blending means for the composition of the present invention is not particularly limited. The wholly aromatic polyester, wollastonite and titanium dioxide may separately be supplied to a melt-mixer, or these materials may previously be pre-mixed on a Henschel mixer, ball mill, ribbon blender, etc. and then supplied to a melt-mixer.

To the composition of the present invention may be added one or more of the common additives such as antioxidants, thermal stabilizers, ultraviolet absorbers, lubricants, release agents, coloring matters such as dyes, pigments, etc., flame retardants or auxiliaries therefor, antistatic agents and the like, so far as they do not damage the object of the present invention.

When the composition of the present invention is injection-molded into relatively large-sized dish- or box-form products, the product, because of its low degree of anisotropy, is free from warp and crack and has high mechanical strength and good appearance. Also, the product holds the original property of the wholly aromatic polyester in terms of thermal resistance and chemical resistance, and therefore it has very superior characteristics when it is used as ovenwares.

The present invention will be illustrated specifically with reference to the following examples, which are however only examples of preferred embodiment, not to be interpreted as limiting the invention thereto.

EXAMPLES 1 TO 7

A wholly aromatic polyester having a repeating unit represented by the formula,

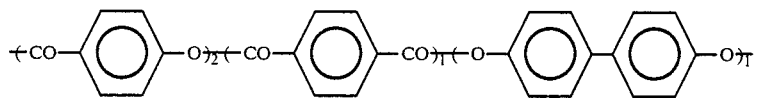

wollastonite (NYAD G; sold from Nagase Sangyo Co.) and titanium dioxide (KR 310; produced by Chitan Kogyo Co.) were mixed in proportions shown in Table 1, extruded on a twin-screw extruder (PCM-30; produced by Ikegai Iron Works, Ltd.) at a temperature of 360° C., and granulated into pellets. Using a 1-ounce injection molding machine (Neomat 47/28; produced by Sumitomo Heavy Industry, Ltd.) under a condition that a cylinder temperature be 380° C., injection pressure be 1500 kg/cm$^2$, injection speed be high and a mold temperature be 120° C., the pellet was formed into test pieces for measurement of mold shrinkage [40 mm × 100 mm × 3 mm (thick)], dumbbell test pieces No. 4 for tensile test (specified by ASTM), test pieces for Izod impact test (3.2 mm) and test pieces for measurement of heat distortion temperature.

As to the mold shrinkage, values in both TD and MD were measured. The tensile characteristics, Izod impact strength and heat distortion temperature were measured according to ASTM D-638, ASTM D-256 and ASTM D-648, respectively. The results of these tests are collectively shown in Table 1.

As apparent from the table, the composition of the present invention showed the excellent properties as follows: The anisotropy improving effect is large as the value of the percent shrinkage ratio of TD to MD shows 5 or less in every example; mechanical strength is large; heat distortion temperature is 300° C. or more; and the appearance is good.

EXAMPLES 8 AND 9

Using a 10-ounce injection molding machine (N 140 A; produced by Nippon Kokan K.K.), the compositions obtained in Examples 3, 4 and 6 were molded at a cylinder temperature of 360° C. into trays of 200 mm (bottom diameter) × 40 mm (height) × 3 mm (thickness) in size. The appearance and state of warp were examined to find that the both were good. These trays were placed on a turn table in an electronic oven (NE-8300 type; produced by Matsushita Electric Industrial Co., Ltd.) equipped with a 2450 mega Hz microwave irradiation apparatus and a 250° C. heater. After irradiating with the microwave for 10 minutes, the trays were heated to 250° C. by the 600 W electric heater, kept at the same temperature for 10 minutes and taken out. The dimension and appearance were examined, but special change was not noticed.

COMPARATIVE EXAMPLES 1 TO 5

The same test was carried out on the cases wherein only the wholly aromatic polyester was used, and the proportions of wollastonite and titanium dioxide outside the effective range were used. The results are shown in Table 1. In the cases wherein only the wholly aromatic polyester was used (Comparative example 1) and wherein the total content of wollastonite and titanium dioxide was less than 20 wt. % (Comparative example 2), the anisotropy was very high and the appearance was not preferred because non-uniform flow marks were generated. When the content of wollastonite was less than 5 wt. % (Comparative example 3), both the tensile strength and impact strength were low, and when the content of titanium dioxide was less than 5 wt. % (Comparative example 4), the appearance was not preferred. When the total content of wollastonite and titanium dioxide exceeded 70 wt. % (Comparative example 5), molding was difficult.

The composition in Comparative example 1 and that in Comparative example 3 having a relatively good appearance were formed into trays in the same manner as in Examples 8 and 9, but very large warp was observed in every case. Thereafter, the electronic oven test was carried out in the same manner as in Examples 8 and 9, but a change in shape was observed in every case.

COMPARATIVE EXAMPLES 6 AND 7

The same test was carried out on the cases wherein wollastonite was replaced by glass fiber (REV-8; produced by Nippon Glass Fiber Co.) (Comparative example 6) and talc (Micron White #5000A; produced by Hayashi Kasei Co.) (Comparative example 7), provided that the proportion of the components was the same as in Example 3 in every case. The results are shown in Table 2. In the composition containing glass fiber, the anisotropy was not improved, and appearance was not preferred because non-uniform flow marks were generated. In the composition containing talc, the improving effect was remarkable in both anisotropy and appearance, but a reduction in mechanical strength, particularly impact strength was large.

TABLE 1

| | Amount blended (wt. %) | | | mold shrinkage (%) | | Tensile characteristics | | | Impact strength (3.2 mm) without notch (kg cm/cm) | Heat distortion temperature 18.6 kg/cm$^2$ (°C.) | Appearance of molded product |
|---|---|---|---|---|---|---|---|---|---|---|---|
| | Wholly aromatic polyester | Wollastonite | Titanium dioxide | MD | TD | Strength (kg/cm$^2$) | Elongation (%) | Modulus of elasticity (kg/cm$^2$) | | | |
| Example 1 | 40 | 50 | 10 | 0.21 | 1.19 | 970 | 3.8 | 96000 | 13 | >300 | |
| Example 2 | 40 | 10 | 50 | 0.42 | 1.47 | 810 | 2.8 | 68000 | 6.7 | >300 | |
| Example 3 | 50 | 40 | 10 | 0.24 | 1.28 | 1040 | 4.4 | 91000 | 15 | >300 | |
| Example 4 | 50 | 25 | 25 | 0.30 | 1.37 | 990 | 4.8 | 83000 | 13 | >300 | |
| Example 5 | 50 | 10 | 40 | 0.46 | 1.52 | 920 | 3.3 | 68000 | 6.9 | >300 | |
| Example 6 | 70 | 20 | 10 | 0.33 | 1.48 | 940 | 5.5 | 79000 | 11 | >300 | |
| Example 7 | 70 | 10 | 20 | 0.35 | 1.67 | 880 | 6.1 | 63000 | 10 | >300 | |
| Comparative | 100 | — | — | 0.11 | 2.94 | 860 | 6.8 | 42000 | 12 | 293 | X |

TABLE 1-continued

| | Amount blended (wt. %) | | | mold shrinkage (%) | | Tensile characteristics | | | Impact strength (3.2 mm) without notch (kg cm/cm) | Heat distortion temperature 18.6 kg/cm$^2$ (°C.) | Appearance of molded product |
|---|---|---|---|---|---|---|---|---|---|---|---|
| | Wholly aromatic polyester | Wollastonite | Titanium dioxide | MD | TD | Strength (kg/cm$^2$) | Elongation (%) | Modulus of elasticity (kg/cm$^2$) | | | |
| Example 1 | | | | | | | | | | | |
| Comparative Example 2 | 90 | 5 | 5 | 0.18 | 2.54 | 840 | 5.9 | 45000 | 11 | 300 | X |
| Comparative Example 3 | 50 | 3 | 47 | 0.51 | 2.08 | 590 | 2.3 | 65000 | 4.3 | >300 | |
| Comparative Example 4 | 50 | 47 | 3 | 0.25 | 1.21 | 1030 | 4.1 | 93000 | 14 | >300 | X |
| Comparative Example 5 | 20 | 40 | 40 | | | | | Molding was difficult. | | | |

(1) : Good.
X: Bad (non-uniform flow marks were generated).

TABLE 2

| | Amount blended (wt. %) | | | mold shrinkage (%) | | Tensile characteristics | | | Impact strength (3.2 mm) without notch (kg cm/cm) | Heat distortion temperature 18.6 kg/cm$^2$ (°C.) | Appearance of molded product |
|---|---|---|---|---|---|---|---|---|---|---|---|
| | Wholly aromatic polyester | Filler | Titanium dioxide | MD | TD | Strength (kg/cm$^2$) | Elongation (%) | Modulus of elasticity (kg/cm$^2$) | | | |
| Comparative Example 6 | 50 | Glass fiber 40 | 10 | 0.10 | 2.06 | 1240 | 7.0 | 72000 | 18 | >300 | X |
| Comparative Example 7 | 50 | Talc 40 | 10 | 0.29 | 0.75 | 700 | 2.7 | 71000 | 3.1 | >300 | |

(1) : Good. X: Bad (non-uniform flow marks were generated).

What is claimed is:

1. Ovenware produced by molding a wholly aromatic polyester resin composition comprising 30 to 80 wt. % of a wholly aromatic polyester having a repeating unit represented by the general formula,

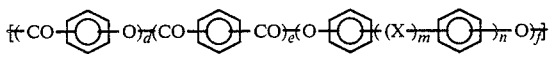

wherein X is a $C_1$-$C_4$ alkyl group or —O—, —SO$_2$—, —S— or —CO— group, m and n are 0 or 1, a d:e ratio is in the range of from 1:1 to 10:1, an e:f ratio is in the range of from 9:10 to 10:9, and the positions of substituents at each aromatic ring of the foregoing general formula are para or meta to each other, 5 to 60 wt. % of wollastonite and 5 to 60 wt. % of titanium oxide.

* * * * *